United States Patent [19]

Fukuoka

[11] Patent Number: 4,628,370
[45] Date of Patent: Dec. 9, 1986

[54] APPARATUS FOR COPYING MAGNETIC TAPE
[75] Inventor: Norio Fukuoka, Tokyo, Japan
[73] Assignee: Olympus Optical Co., Ltd., Tokyo, Japan
[21] Appl. No.: 621,488
[22] Filed: Jun. 18, 1984
[30] Foreign Application Priority Data
  Jun. 20, 1983 [JP] Japan .................. 58-110597
  Jul. 27, 1983 [JP] Japan .................. 58-137329
[51] Int. Cl.$^4$ .................. G11B 5/86; G11B 15/48
[52] U.S. Cl. .................. 360/15; 360/74.1
[58] Field of Search .................. 360/15, 74.1, 74.6, 360/74.7; 369/84

[56] References Cited
U.S. PATENT DOCUMENTS

| | | | |
|---|---|---|---|
| 3,620,476 | 11/1971 | Cervantes | 360/15 |
| 3,805,284 | 4/1974 | Coon, Jr. et al. | 360/15 |
| 3,889,292 | 6/1965 | Bocek | 360/15 |
| 4,410,917 | 10/1983 | Newdoll et al. | 360/15 |
| 4,470,084 | 9/1984 | Bingaman | 360/15 |

Primary Examiner—Vincent P. Canney
Attorney, Agent, or Firm—Frishauf, Holtz, Goodman & Woodward

[57] ABSTRACT

An apparatus for copying magnetic tape, comprising a slave deck having an operation panel and a plurality of copying units for receiving tapes to be copied, a master deck having a master tape and capable of providing a reproduced output from the master tape to the tape to be copied by the slave deck and producing start and finish signals corresponding respectively to the start and finish of the master tape's contents to be copied, and a control unit responsive to operation of the operation panel for setting the copying units of the slave deck to a copying mode, rewinding mode, or stopping mode, for setting the master deck to a reproducing mode, rewinding mode, or stopping mode, and for causing rewinding of the tape to be copied and the master tape to their initial state responsive to finish signals corresponding to the finish of the master tape's contents when the slave deck is set to the copying mode and the master deck is set to the reproducing mode.

4 Claims, 4 Drawing Figures

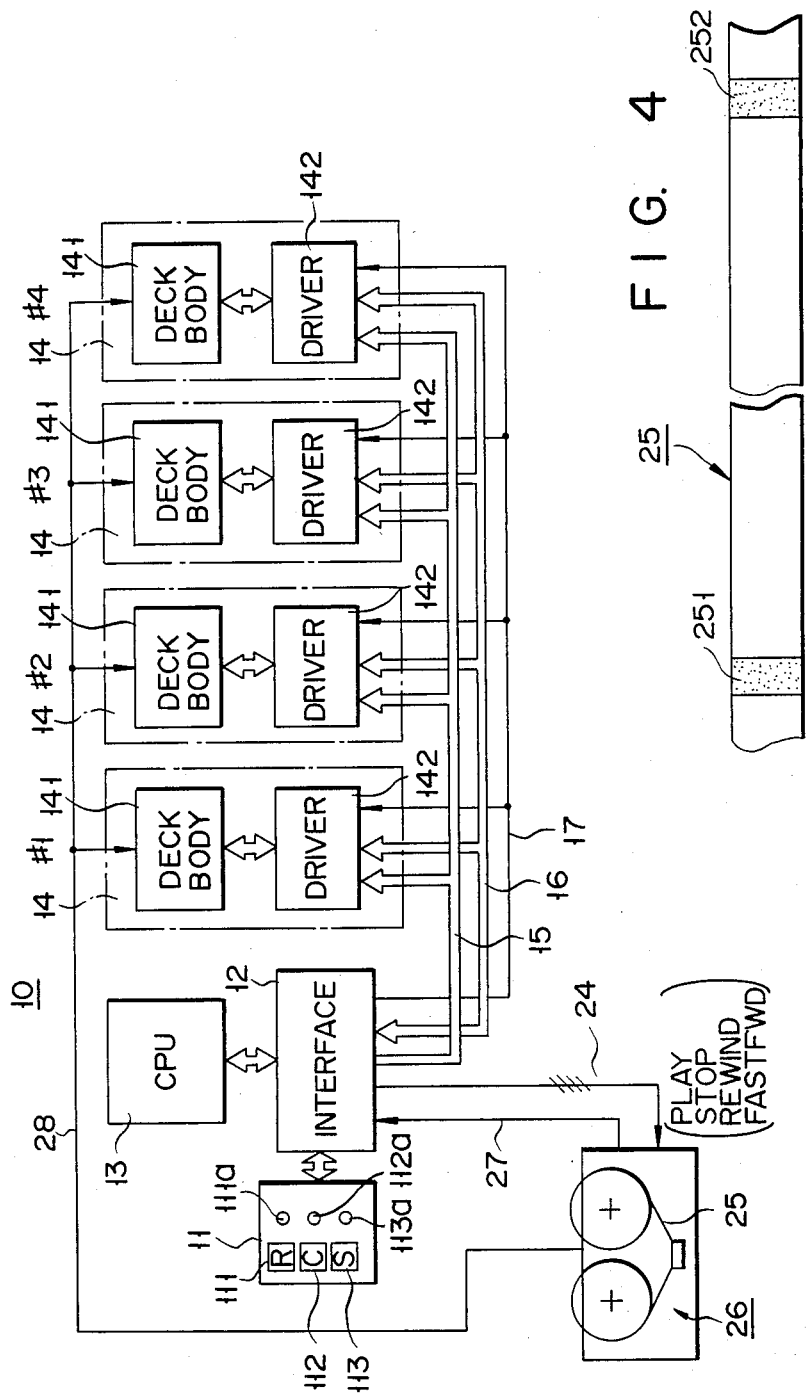

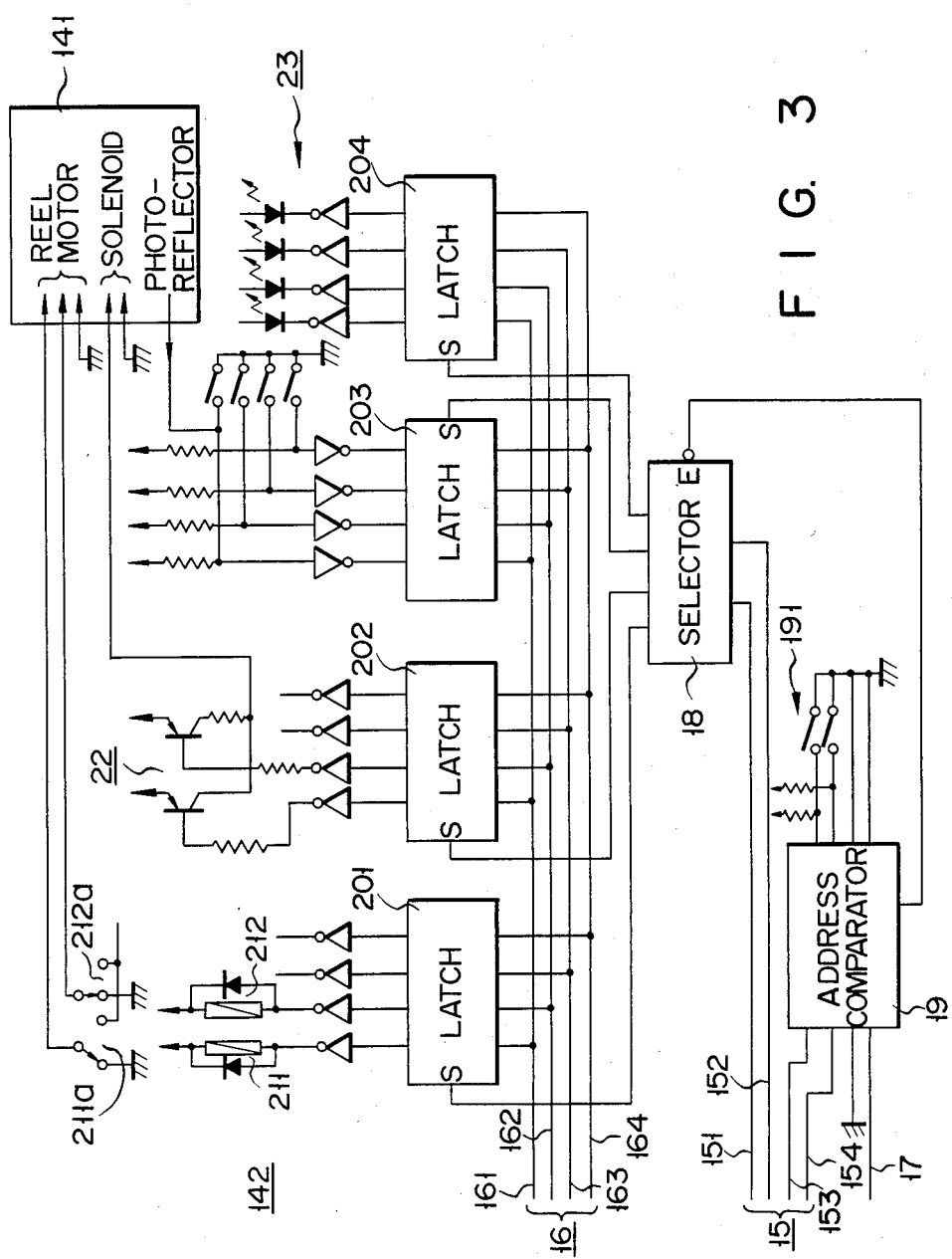

APPARATUS FOR COPYING MAGNETIC TAPE

BACKGROUND OF THE INVENTION

The present invention relates to an apparatus for copying magnetic tape to simultaneously copy the contents of a master tape onto a plurality of blank tapes.

Recently, microcomputers have become increasingly popular, and various types of programs used therefor have been recorded on magnetic tapes and the tapes have been sold.

The contents of such magnetic tapes are copied from a master tape, and an apparatus for simultaneously copying onto a plurality of blank tapes is generally used. The conventional apparatus for copying magnetic tape comprises, as shown in FIG. 1, an open reel type of master deck 2 having a master tape 1, and a cassette-type of a slave deck 4 connected to the master deck 2 for receiving a plurality of blank tapes 3 to be copied with the contents of the master tape 1. The contents of the master tape 1, on which the contents are recorded at 1.9 cm/sec., are reproduced via the master deck 2 at 3.8 cm/sec. and are recorded on the respective blank tapes 3 at the slave deck 4 side at 3.8 cm/sec., thereby copying the contents at twice the ordinary speed.

The conventional apparatus for copying magnetic tape as described above is defective in that the taping operations should all be individually performed in the respective decks, such that the taping operations at the master deck 2 are all achieved at the master deck 2 side and the taping operations at the slave deck 4 are all achieved at the slave deck 4 side. Since the master deck 2 is ordinarily installed separately from the slave deck 4, operators must frequently reciprocate between the decks 2 and 4, with the result that the taping operations are not only performed with numerous tasks, but the efficiency of the copying operation is remarkably deteriorated.

SUMMARY OF THE INVENTION

An object of the present invention is to provide an apparatus for copying magnetic tape which can eliminate the above-described drawbacks and permits a concentration of all operations including the taping operations in the master and slave decks and exchanging of blank tapes to be copied by the slave deck side and also permits the the simplification of the operations and improvements in the efficiency of the duplicating process.

Another object of the present invention is to provide an apparatus for copying magnetic tape which permits a concentration of all operations including taping operations in the master and slave decks and exchanging of blank tapes to be copied at the slave deck and also permits continuous and repetitive copying operations, simplification of the operations and improvements in the efficiency of the copying process.

According to one aspect of the present invention, there is provided an apparatus for copying magnetic tape, comprising: a slave deck having an operation panel and a plurality of copying units adapted to receive tapes to be copied; a master deck having a master tape and capable of providing a reproduced output from the master tape to the tape to be copied by the slave deck and producing start and finish signals corresponding respectively to the start and finish of the contents on the master tape to be copied; and control means responsive to operation of the operation panel for permitting the setting the copying units of the slave deck to a copying mode, rewinding mode or stopping mode, for setting the master deck to a reproducing mode, rewinding mode or stopping mode, and for causing rewinding of the tape to be copied and the master tape to initial state responsive to finish signals corresponding to the finish of the master tape's contents when the slave deck is set to the copying mode and the master deck is set to the reproducing mode.

According to the above-described construction of the apparatus for copying magnetic tape, since all the operations, including the tape operations in the master and slave decks and the exchanging of the blank tapes to be copied can be carried out at the slave deck side, the operations can be simplified, and the efficiency of the copying process can be improved.

BRIEF DESCRIPTION OF THE DRAWINGS

FIG. 2 is a schematic view showing the structure of an embodiment of the present invention;

FIG. 3 is a schematic view showing the structure of a copying unit used for the FIG. 3 embodiment; and FIG. 4 is a schematic view showing the structure of a master tape used in the embodiment of the invention.

DETAILED DESCRIPTION OF THE PREFERRED EMBODIMENTS

Figure 1:
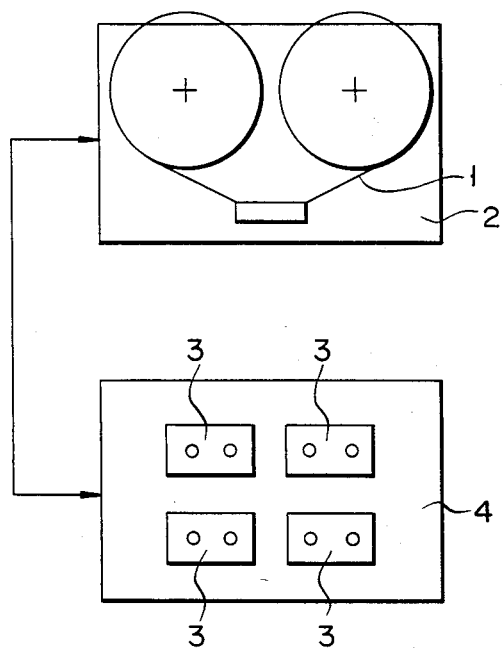
FIG. 1 is a schematic view showing the structure of an example of a conventional apparatus for copying magnetic tape.

An embodiment of the present invention will be described with reference to the accompanying drawings.

In FIG. 2, reference numeral 10 designates a slave deck. In the slave deck 10, reference numeral 11 designates an operation panel comprising, for example, a keyboard, which has a REWIND key 111, a COPY key 112, and a STOP key 113, and which also has displays for indicating displays corresponding to the operations of these keys 111 to 113 such as, for example, display lamps 111a to 113a. A central processing unit (which will be abbreviated as "CPU") 13 is connected through an interface 12 to the keyboard 11. The CPU 13 contains all control programs.

On the other hand, reference numeral 14 depicts a plurality of (four, #1 to #4, in the embodiment shown) copying units which blank tapes to be copied (not shown) are set, and each copying unit 14 has a deck body 141, to which the blank tape to be copied is set, and a unit driver 142. An address bus 15, a data bus 16, and a remote line 17 are connected as unit buses between the unit driver 142 and the interface 12.

The above-described unit driver 142 is concretely constructed as shown in FIG. 3, which shows only one unit driver 142. More specifically, the address bus 15 has four lines 151, 152, 153 and 154, two lines 151, 152 of which are connected to a selector 18, and the remaining two lines 153, 154 of which are connected to an address comparator 19. This comparator 19 generates a comparison output with a set address 191 to apply the comparison output to an enable terminal E of the selector 18 upon reception of a remote signal to the remote line 17. A strobe terminal S of latches 201 to 204 is connected to the output terminal of the selector 18. These latches 201 to 204 are connected to four data lines 161 to 164 of the data bus 16 to output the data of the data bus 16 when a strobe pulse is applied to the strobe terminal S. In this case, reel motor driving relays 211 and 212 are connected to the latch 201 to apply a reel motor driving output to the deck body 141 through the contacts 211a and 212a of these relays 211 and 212. A drive circuit 22 of a solenoid for changing the mode is connected to the latch 202 to apply the solenoid driving output to the deck body 141 by the drive circuit 22. Further, signals representing the tape running state from the deck body 141 such as, for example, tape constant speed running, high speed running, and stopping states are applied to the latch 203. These signals are obtained, for example, by providing a photoreflector, i.e., a reflecting plate at a rotating reel side, emitting a light to the reflecting plate and generating the respective state signals from the lights reflected on the reflecting plate. Further, a display circuit 23 for displaying the states is connected to the latch 204.

Turning to FIG. 2, the master deck 26, in which the master tape 25 is received, is connected through a control line 24 to the interface 12. The control line 24 has a line for instructing the PLAY of the master deck 26, a line for instructing the STOP, a line for instructing the REWIND, and a line for instructing the FASTFWD. A line 27 for feeding a sensing point signal is connected between the master deck 26 and the interface signal 12. The master tape 25 received in the master deck 26 employs, as shown in FIG. 4, conductive parts 251 and 252 such as aluminum foils respectively attached to the start and finish of the master tape's content to be copied. The master deck 26 detects the conductive part 251 to generate a sensing point signal of a copy start and detects the conductive part 252 to generate a sensing point signal of a copy end.

The output of the master deck 26, i.e., the reproduced output of the master tape 25, is applied through the line 28 directly to the deck body 141 of the copying units 14 of #1 to #4 at the slave deck 10 side to be copied onto the blank tapes (not shown) set in the deck body 141.

The operation of the copying unit will now be described.

When a power source is energized, all the copying units 14 of #1 to #4 are checked as to whether or not they are in the STOP mode by the program in the CPU 13. In this case, the latch 203 of each unit 14 is selected by the address code to the address bus 15, and the state signal of the photoreflector of the deck body 141 is detected through the data bus 16 to execute the check.

Assume that all the units 14 are set to the STOP mode and the COPY key 112 is operated at the keyboard 11 in this state. After the fact that the key input, at this time effective to the mode (STOP mode at this time) of the respective units 14, is confirmed, the address code is output to the address bus 15 and the data code is output to the data bus 16 in accordance with the program in the CPU 13. By considering the copying unit 14 of #1 in this case, the address code is applied through the lines 151 and 152 of the address bus 15 to the selector 18, and the address code is also applied through the other lines 153 and 154 to the address comparator 19. When the address code coincides with the contents of the set address 191 at this time, a comparison output is applied to the enable terminal E of the selector 18 upon reception of the remote signal to the remote line 17. Therefore, when the latch 201 is selected by the selector 18, the data of the data bus 16 is loaded through the latch 201 and latched, the reel motor driving relays 211 and 212 are energized, and the reel motor driving output is applied to the deck body 141 side through the contacts 211a and 212a. Then, when the latch 202 is selected in the same manner as described above, the mode changing solenoid drive circuit 22 is energized, and the solenoid driving output is applied to the deck body 141 side. In this manner, the copying unit of #1 is set to the COPY mode.

The above-described operations are also sequentially performed in the copying units of #2 to #4 in the same manner as described above, and all the units 14 are set to the COPY mode. In this case, the settings of the COPY mode to the units 14 are sequentially executed by displacing, for a predetermined period of time, and considering the current capacity required for starting the motors and operating the solenoids of the respective units 14, thereby minimizing the current capacity as seen from the power source side.

On the other hand, the PLAY signal is applied to the master deck 26 through the control line 24 by the operation of the COPY key 112 in the keyboard 11. Thus, the master deck 26 is set to the PLAY mode. Then, the output of the master deck 26, i.e., the reproduced output of the master tape 25 is applied through the deck body 141 of the respective copying units 14 and copied on the blank tapes received in the deck body 141.

The tape ends of the copy units 14 of #1 to #4 are checked by the program of the CPU 13 in this state. The latch 203 is selected for each copying unit 14 by the address code to the address bus 15 in this case, and the state signal of the photoreflector of the deck body 141 is detected through the data bus 15, thereby performing the check. In this manner, any of the blank tapes to be copied by the copying units 14 which has reached the end of copying due to a certain reason in the course the copying step is detected.

Subsequently, when the master tape 25 is being reproduced in the master deck 26 and the contents of the tape 25 reaches the finish, the sensing point signal of the COPY end is generated based on the conductive part 252 shown in FIG. 4 and fed through the line 27 and the interface 14 to the slave deck 10 side. Then, the copying unit 14 and the master deck 26 are temporarily set to the STOP mode by the program of the CPU 13, and when the STOPs of the units 14 and the master deck 26 are thereafter confirmed, the copying units 14 and the master deck 26 are set to the REWIND mode.

The blank tapes thus copied are respectively rewound in the deck bodies 141 of the respective copying units 14 in this state, and the tape ends of the blank tapes thus copied are checked simultaneously. In this case, the address to the address bus 15 is selected for the latch 203 for each copying unit 14 by the address code to the address bus 15 in the same manner as described above, and the state signal of the photoreflector of the deck body 141 is detected through the data bus 16, thereby performing the check. When the tape end is detected, the copying unit 14 which has the tape end is sequentially set to the STOP mode. On the other hand, when the master tape 25 of the master deck 26 has arrived at the starting part of the contents of the master tape by the rewinding operation of the tape, the sensing point signal is generated based on the conductive part 251 shown in FIG. 4 and fed through the line 27 and the interface 12 to the slave deck 10 side. Thus, the master deck 26 is set to the STOP mode by the CPU 13. In this case, the master deck 26 is controlled until the tape is stopped accurately at the conductive part 251 of the master tape 25 and hence the start of the contents of the master tape 25. In this manner, the first copying operation of the blank tape to be copied has been completed.

Then, the blank tapes thus copied of the respective copying units 14 are replaced with new blank tapes, and the COPY key 112 is again operated in the keyboard 11. Then, the contents of the master tape 25 are copied on the blank tapes on the respective copying units 14 in the same manner as described above.

If the STOP key 113 is operated in the keyboard 11 when the copying operation of the copying units 14 is intended to be stopped in the course of the copying operation, the respective copying units 14 can be set to the STOP mode by the address code of the address bus 15 and the data code of the data bus 16, and the copying operation can be interrupted.

If the REWIND key 111 is operated when the blank tapes to be copied by the copying units 14 are desired to be rewound, the copying units 14 are set to the REWIND mode by the address code of the address bus 15 and the data code of the data bus 16, and the blank tapes to be copied can be rewound.

Therefore, according to the construction of the embodiment of the present invention as described above, the taping operations of the master and slave decks can be performed by the keyboard operation at the slave deck side. Thus, all the operations including the exchange of the blank tapes to be copied by the slave deck side can be concentrated at the slave deck side, thereby remarkably simplifying the respective operations as compared with the conventional apparatus which requires frequent reciprocation between the decks by the operators, thereby significantly improving the efficiency of the copying operations.

The present invention is not limited to the particular embodiment described above. Various other changes and modifications may be made within the spirit and scope of the present invention. For example, in the embodiment described above, the copying units 14 are immediately set to the COPY mode by the operation of the COPY key 112 in the keyboard 11. However, the respective COPY modes 14 can be temporarily set to the REWIND mode by the COPY key 112, the rewind of the blank tape to be copied is confirmed, and then the COPY mode may be set.

Further, as another modified embodiment, when the master tape 25 of the master deck 26 is stopped at the start of the contents on the master tape after the first copying operation is completed, the copying units 14 of #1 to #4 may again be set to the COPY mode in the same sequence as described above by the program of the CPU 13 upon stopping the tape, and the master deck 26 may be set to the PLAY mode. In this case, the blank tapes to be copied on the respective copying unit 14 may be exchanged with new ones because there is a predetermined period of time from when the above-described copying units 14 are sequentially stopped to when the master deck 26 is stopped accurately at the start of the contents of the master tape.

As described above, the contents of the master tape 25 may be repeatedly copied on the blank tapes at the copying units 14 merely by exchanging the blank tapes thus copied with new crude tapes whenever the blank tapes are thus completely copied, and the blank tapes can be continuously copied in the same manner as described above.

Then, when any of the blank tapes of the copying units 14 becomes, for example, defective so that the tape hub becomes impossible to rotate in the course of a copying operation in the state that the copying units 14 are all set to the COPY modes, this defective state is detected by the tape end check of the copying units 14 of #1 to #4 by the program of the CPU 13 as described above. In this case, the defective copying unit 14 is immediately set to the STOP mode, and the defective state is indicated on the display circuit 12 of the unit driver 142 of the copying unit 14. Then, when the blank tapes of the other copying units 14 are completely copied, the other copying units 14 are set to the REWIND mode together with the master deck 26, except the defective copying unit 14, and the tapes are rewound. When the other copying units 14 and master deck 26 are completely rewound, the COPY mode of the other copying units 14 and the PLAY mode of the master deck 26 are not reset, and the continuous operation is temporarily interrupted. In this case, when the COPY key 112 is operated in the keyboard 11 after the defect of the defective copying unit 14 is removed, the above-described continuous operation can again be continued.

Even in this case, the interruption of the copying operation and the rewinding of the blank tapes can be performed in the same manner as described above.

Therefore, according to the modified embodiment described above, the tape operations of the master and slave decks can be concentrated to the slave deck side by the keyboard operation at the slave deck side with the operation including the exchange of the blank tapes to be copied at the slave deck side, and the copying operations can be continuously performed. Consequently, the respective operations can be remarkably simplified as compared with the conventional apparatus in which the operators should frequently move between the decks. Since the blank tapes thus copied are merely exchanged with new blank tapes after the copying operations are continuously achieved, the efficiency of the copying work can be significantly improved.

Since the apparatus of the invention is constructed such that the copying unit is set to the STOP mode and a defect is indicated on the display circuit when any of the copying units becomes defective, the other copying units are operated to carry out the tape rewinding operations and when completed, the continuous operation is temporarily interrupted, the defective copying unit can be reliably notified, the optimum remedy can be performed for the defective copying unit, and the influence of the defect to the other copying units can be prevented in advance.

What is claimed is:

1. An apparatus for copying magnetic tape, comprising:

a slave deck having an operation panel and a plurality of copying units for receiving tapes to be copied;

a master deck means having a master tape and providing a reproduced output from the master tape to the tapes to be copied by the slave deck and producing start and finish signals corresponding respectively to the start and finish of the master tape's contents to be copied; and control means coupled to said operation panel, to said slave deck and to said master deck, for selectively setting said copying units of the slave deck to a copying mode, a rewinding mode, or a stopping mode responsive to the setting of said operation panel, for setting of the master deck to a reproducing mode, rewinding mode, or stopping mode, and for causing rewinding of the tapes to be copied and the master tape to their initial state responsive to finish signals corresponding to the finish of the master tape's contents when the slave deck is set to the copying mode and the master deck is set to the reproducing mode;

wherein said control means comprises first means for detecting the state of the respective copying units, and second means for setting said copying units to the stopping mode responsive to detection of a defective copying unit by said detecting means, and for interrupting a following rewinding operation of the defective copying unit thereafter;

whereby operation of said operation panel and changing of tapes in said slave deck are carried out at said slave deck.

2. An apparatus for copying magnetic tape according to claim 1, wherein said control means includes means for setting said copying units sequentially to a predetermined mode by an address code and a data code at a predetermined period of time.

3. An apparatus for copying magnetic tape according to claim 1, wherein said control means comprises means for detecting the state of the respective copying units.

4. An apparatus for copying magnetic tape according to claim 1, wherein the master tape comprises conductive parts provided at the start and finish of the contents of the master tape; and means for producing said start and finish signals responsive to detection of said conductive parts.

* * * * *